US011080511B2

(12) United States Patent
Shannon et al.

(10) Patent No.: US 11,080,511 B2
(45) Date of Patent: Aug. 3, 2021

(54) CONTACTLESS ROLLED FINGERPRINTS

(71) Applicants: Robert W. Shannon, Stillwater, MN (US); Glenn E. Casner, Woodbury, MN (US); Douglas Scott Dunn, Woodbury, MN (US); Anne Jinsong Wang, Pasadena, CA (US); Chin-Yee Ng, Oakdale, MN (US); Brian L. Linzie, Stillwater, MN (US); Brett A. Howell, Ramsey, MN (US)

(72) Inventors: Robert W. Shannon, Stillwater, MN (US); Glenn E. Casner, Woodbury, MN (US); Douglas Scott Dunn, Woodbury, MN (US); Anne Jinsong Wang, Pasadena, CA (US); Chin-Yee Ng, Oakdale, MN (US); Brian L. Linzie, Stillwater, MN (US); Brett A. Howell, Ramsey, MN (US)

(73) Assignee: THALES DIS FRANCE SA, Meudon (FR)

( * ) Notice: Subject to any disclaimer, the term of this patent is extended or adjusted under 35 U.S.C. 154(b) by 6 days.

(21) Appl. No.: 16/488,971

(22) PCT Filed: Mar. 28, 2018

(86) PCT No.: PCT/US2018/024788
§ 371 (c)(1),
(2) Date: Aug. 27, 2019

(87) PCT Pub. No.: WO2018/161095
PCT Pub. Date: Sep. 7, 2018

(65) Prior Publication Data
US 2020/0074132 A1 Mar. 5, 2020

Related U.S. Application Data

(60) Provisional application No. 62/464,904, filed on Feb. 28, 2017.

(51) Int. Cl.
*G06K 9/00* (2006.01)
*G06K 9/20* (2006.01)
*G02B 17/08* (2006.01)

(52) U.S. Cl.
CPC .......... *G06K 9/001* (2013.01); *G02B 17/08* (2013.01); *G06K 9/00033* (2013.01);
(Continued)

(58) Field of Classification Search
CPC .......... G06K 9/001; G06K 9/00033; G06K 9/00067; G06K 9/2027; G06K 9/00;
(Continued)

(56) References Cited

U.S. PATENT DOCUMENTS

2008/0056539 A1* 3/2008 Sweeney ............ G06K 9/00382
382/115
2012/0269404 A1* 10/2012 Hassebrook ............ G06K 9/00
382/115
(Continued)

FOREIGN PATENT DOCUMENTS

WO 2016144671 A1 9/2016

OTHER PUBLICATIONS

International Search Report (PCT/ISA/210) dated Jul. 11, 2018, by the ISA/US, Commissioner for Patents as the International Searching Authority for International Application No. PCT/US2018/024788.
(Continued)

*Primary Examiner* — Abdul-Samad A Adediran
(74) *Attorney, Agent, or Firm* — Buchanan Ingersoll & Rooney PC (57) ABSTRACT

In an example, a method includes capturing one or more friction ridge images of a finger at an instance in time, the one or more friction ridge images including a plurality of perspectives of the finger. The method also includes deter-
(Continued)

mining, from the one or more friction ridge images, a rolled fingerprint representation of the finger, the rolled fingerprint representation comprising data from the plurality of perspectives, and outputting the rolled fingerprint representation.

22 Claims, 5 Drawing Sheets

(52) U.S. Cl.
CPC ....... *G06K 9/00067* (2013.01); *G06K 9/2027* (2013.01); *G06T 2200/04* (2013.01)

(58) Field of Classification Search
CPC ............ G06K 9/00892; G06K 9/00382; G06T 2200/04; G02B 17/08
USPC .................................... 348/77; 382/115, 124
See application file for complete search history.

(56) References Cited

U.S. PATENT DOCUMENTS

| | | | |
|---|---|---|---|
| 2014/0044323 A1 | 2/2014 | Abramovich et al. | |
| 2015/0097936 A1* | 4/2015 | Simske | G02B 17/08 348/77 |
| 2015/0130917 A1* | 5/2015 | Mil'shtein | G06K 9/00033 348/77 |
| 2015/0208059 A1 | 7/2015 | Hassebrook et al. | |
| 2016/0019673 A1* | 1/2016 | Sakamoto | G06K 9/00067 382/124 |
| 2016/0210493 A1 | 7/2016 | Walch et al. | |
| 2018/0068100 A1* | 3/2018 | Seo | G06K 9/00892 |

OTHER PUBLICATIONS

Written Opinion (PCT/ISA/237) dated Jul. 11, 2018, by the ISA/US, Commissioner for Patents as the International Searching Authority for International Application No. PCT/US2018/024788.

Chen et al., "3D Touchless Fingerprints: Compatibility With Legacy Rolled Images", Biometric Consortium Conference, 2006 Biometrics Symposium: Special Se Ssion on Research at the, IEEE, PI, Sep. 1, 2006 (Sep. 1, 2006), pp. 1-6, XP031141444.

Veeraganesh et al., "Full-Hand 3D Non-Contact Scanner Using Sub-Window-Based Structured Light-Illumination Technique", Sensing Technologies for Global Health, Military Medicine, Disaster Response, and Environmental Monitoring II; and Biometric Technology for Human Identification Ix, SPIE, 1000 20th St. Bellingham WA 98225-6705 USA, vol. 8371, No. 1, May 11, 2012 (May 11, 2012), pp. 1-15, XP060002749.

Extended European Search Report dated Dec. 16, 2020 issued by the European Patent Office in corresponding European Application No. 18760995.3. (9 pages).

* cited by examiner

CONTACTLESS ROLLED FINGERPRINTS

TECHNICAL FIELD

This disclosure relates to image processing, and, more specifically, processing images of fingerprints.

BACKGROUND

Fingerprints, palm prints, or other biometric data may be used by a variety of government, commercial, residential or industrial entities for verifying the identity of an individual. Example applications include identifying individuals at border locations, confirming an identity for purposes of access control or authentication, or identifying an unknown individual during a forensic investigation. In such applications, friction ridge data or images containing other identifying features may be obtained and compared to an existing sample.

Friction ridge data may be obtained in a variety of ways. In one example, friction ridge data may be captured by pressing an extremity (e.g., a finger) against an ink source and then pressing and rolling the extremity onto a piece of paper. In another example, fiction ridge data may be captured by pressing or rolling the extremity against a hard surface (e.g., glass, silicon, or polymer) and capturing an image of the extremity with a sensor. In still another example, friction ridge data may be captured by taking an image of the extremity, which may be referred to as contactless print technology.

SUMMARY

Techniques of this disclosure generally relate to capturing and processing a friction ridge image. In particular, the techniques of this disclosure include capturing one or more friction ridge images that include multiple perspectives of an object, such as a finger. According to aspects of this disclosure, a computing device may generate a rolled fingerprint representation that includes data from the multiple perspectives from the one or more images. In this way, the techniques may be used to generate a non-contact based representation that simulates the finger being rolled over a surface, as may typically be associated with a contact-based acquisition of the fingerprint. The techniques may, in some instances, provide a more accurate representation of a fingerprint than a fingerprint resulting from a contact-based acquisition. In addition, by capturing the one or more images at a single instance in time and/or using a computing device having a relatively small form factor, the techniques may enhance accuracy and efficiency.

In an example, a method includes capturing one or more friction ridge images of a finger at an instance in time, the one or more friction ridge images including a plurality of perspectives of the finger. The method also includes determining, from the one or more friction ridge images, a rolled fingerprint representation of the finger, the rolled fingerprint representation comprising data from the plurality of perspectives, and outputting the rolled fingerprint representation.

In another example, a device comprises one or more cameras configured to capture one or more friction ridge images of a finger at an instance in time, the one or more friction ridge images including a plurality of perspectives of the finger; a memory configured to store the one or more friction ridge images; and one or more processors configured to determine, from the one or more friction ridge images, a rolled fingerprint representation of the finger, the rolled fingerprint representation comprising data from the plurality of perspectives; and output the rolled fingerprint representation.

The details of one or more examples are set forth in the accompanying drawings and the description below. Other features, objects, and advantages will be apparent from the description and drawings, and from the claims.

DETAILED DESCRIPTION

Techniques of this disclosure include determining a rolled fingerprint representation of a finger based on one or more images that include multiple perspectives of the finger. Historically, fingerprints and palm prints were acquired manually by having an individual put ink on their finger and pressing their finger and palm onto a piece of paper, resulting in a friction ridge image. Ink-based acquisition techniques may be both time consuming and visually noisy. For example, during the acquisition process the ink may bleed or become smeared on the paper. In addition, too much or too little ink may compromise the quality of the acquired print.

In some examples, friction ridge images may be digitally acquired. For instance, a subject may place a finger or palm on a glass or other transparent surface, and an image may be taken through the glass or another transparent surface. However, contact acquisition of friction ridge images (e.g., either ink based or digital images) may have a number of limitations. For example, contact-based print technologies may produce partial or degraded images due to improper hand placement, skin deformation, slippage and smearing, or sensor noise from wear and tear of surface coatings. Further, contact-based technologies often produce low-quality prints due to the uncontrollability and non-uniformity of hand pressure, as well as from the residues (e.g., oil, sweat, dirt) that can be present from previous prints.

In addition, contact prints typically require the person providing their prints to place their hands in specific positions, on or near certain devices, and perform certain motions that may be difficult to physically perform. Whether due to the person's age, physical limitations, disabilities or other practical considerations, acquisition of quality prints may suffer from various human factors requirements involved in the relative positions and hand or body motions involved.

The difficulty in obtaining a high-quality contact-based fingerprint may be compounded when acquiring a rolled fingerprint. A rolled fingerprint is typically acquired by rolling a pad of a finger from one side of a fingernail to the opposite side of the fingernail. The rolling motion is intended to acquire a maximum amount of fingerprint data across a finger, beyond what can be captured by simply pressing the finger flat upon a surface. For example, the rolling motion may acquire approximately 180 degrees of a finger, e.g., from edge to edge of the pad. The rolling motion may be difficult to execute consistently and often requires not only the subject of the fingerprint to contact an acquisition device, but also a trained fingerprint acquisition administrator to contact the subject in order to assist in acquiring a rolled fingerprint of acceptable quality.

Non-contact techniques for capturing fingerprints may also have potential drawbacks. For example, certain non-contact scanning devices may take an image of a hand at a distance and use a series of image processing algorithms to extract and enhance the fingerprints from the raw image. However, typical non-contact fingerprint acquisition technologies may be limited to acquiring a relatively simple and flat two-dimensional image of the finger (e.g., from a single perspective) and do not accommodate a rolled capture for a rolled fingerprint. In addition, non-contact acquisition devices may be relatively large and stationary, which may be a limiting factor for many law enforcement applications in particular.

The techniques of this disclosure may, in some instances, address the technical and practical problems of acquiring and/or processing one or more digital friction ridge images, and may address one or more of the potential issues discussed above. For example, according to aspects of this disclosure, a computing device may capture, at a particular instance in time, one or more friction ridge images that include multiple perspectives of an object, such as a finger, without being in contact with the device responsible for capturing the images. As described herein, a friction ridge image is an image of a friction ridge surface, which may include any area of skin having durable morphological features or minutiae, including unique ridges, creases, scars and pores. As described herein, a perspective may generally refer to an appearance of an object when viewed from a particular location. The computing device may generate a rolled fingerprint representation that includes data from the multiple perspectives. In some examples, the rolled fingerprint representation may include data from approximately a 180-degree view of a pad of a fingertip, e.g., from approximately the edge of a nail of the fingertip to the other edge of the fingertip. In some instance, the computing device may have a relatively small form factor, and may be movable with respect to the finger being captured.

In this way, the techniques may be used to generate a non-contact based representation that simulates the finger being rolled over a surface, as may typically be associated with a contact-based acquisition of the fingerprint. The non-contact based representation may, in some instances, provide a more accurate representation of a fingerprint than a fingerprint resulting from a contact-based acquisition. However, the rolled fingerprint representation may still be accurately compared to legacy contact-based prints. In addition, by capturing the one or more images at a single instance in time and/or using a computing device having a relatively small form factor, the techniques may enhance accuracy and efficiency.

Figure 1:
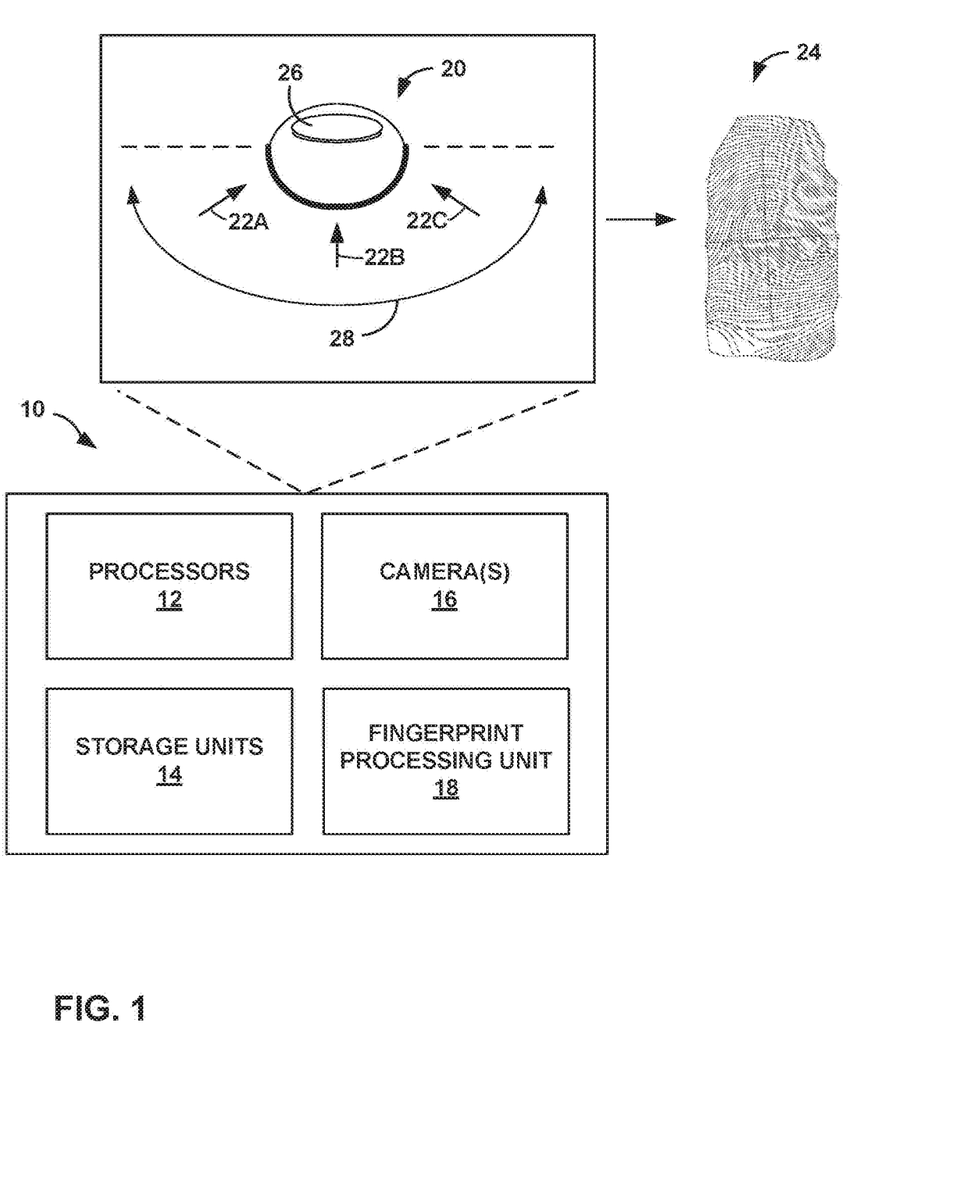
FIG. 1 is a block diagram illustrating an example computing device configured to generate a rolled fingerprint representation of a finger, according to aspects of this disclosure.

FIG. 1 is a block diagram illustrating an example computing device configured to generate a rolled fingerprint representation of a finger, according to aspects of this disclosure. In the example of FIG. 1, computing device 10 includes processors 12, storage units 14, one or more cameras 16 and fingerprint processing unit 18. Computing device 10 may be configured to capture and process one or more images of finger 20 that include a plurality of perspectives 22A-22C (collectively, perspectives 22) of finger 20 for determining a rolled fingerprint representation 24.

Figure 4:
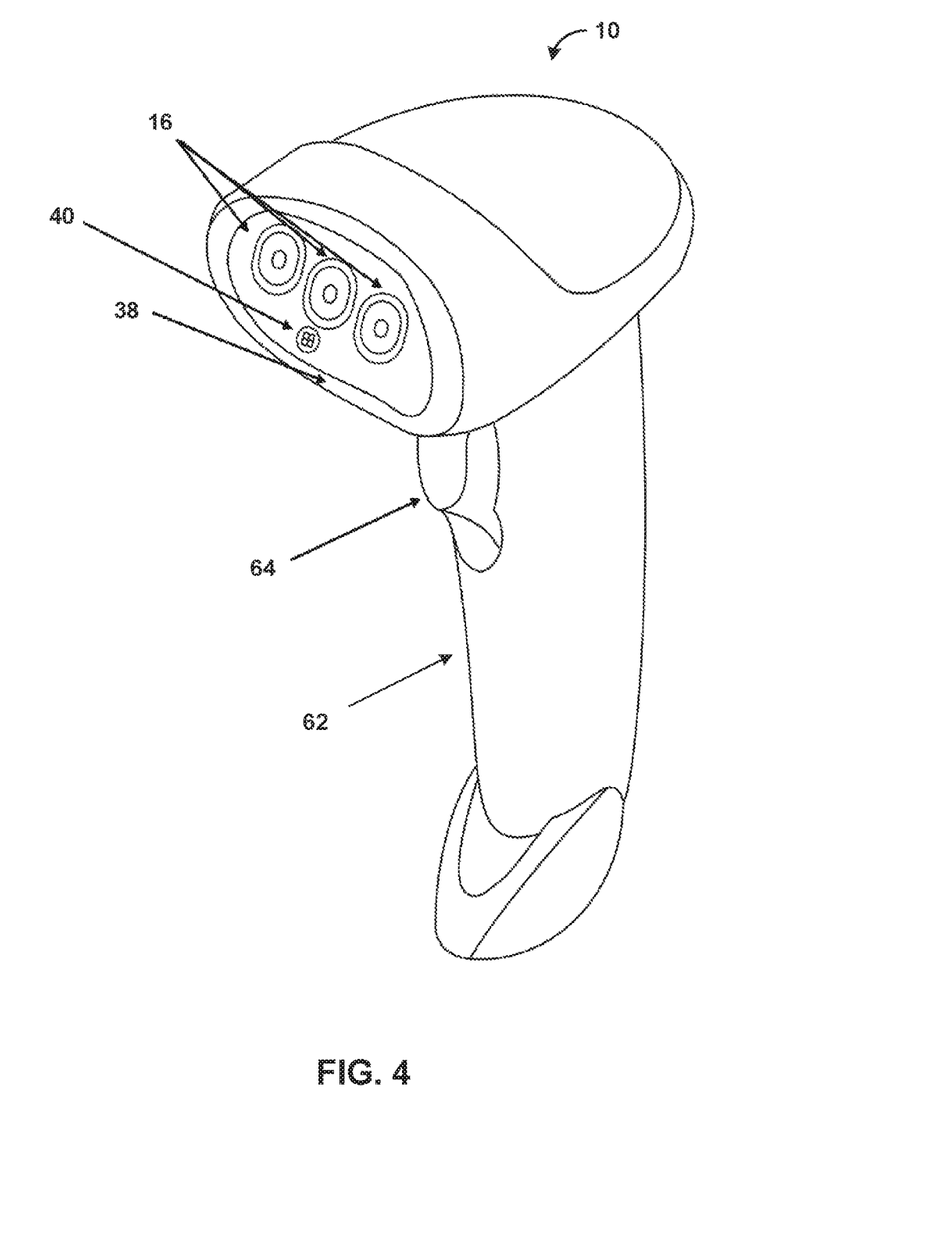
FIG. 4 is conceptual diagram illustrating an example of a computing device that is configured to capture one or more images for generating a rolled fingerprint representation, according to aspects of this disclosure.

The functionality of computing device 10 may be implemented in hardware or in a combination of software and hardware, where requisite hardware may be provided to store and execute software instructions. Computing device 10 may include a variety of devices for processing and/or manipulating data. In one example, computing device 10 may be incorporated in an apparatus for capturing and/or processing friction ridge images (e.g., as illustrated in the example of FIG. 4).

While illustrated as a single computing device 10 for purposes of illustration, it should be understood that computing device 10 may include a plurality of individual components. For example, processors 12 may be included in a device that is separate from one or more cameras 16. Moreover, many other examples of computing device 10 may be used in other instances and may include a subset of the components included in example computing device 10 or may include additional components not shown in example computing device 10 of FIG. 1.

Processors 12, in one example, are configured to implement functionality and/or process instructions for execution within computing device 10. For example, processors 12 may be capable of processing instructions stored by storage units 14. Processors 12 may include, for example, microprocessors, digital signal processors (DSPs), application specific integrated circuits (ASICs), field-programmable gate array (FPGAs), or equivalent discrete or integrated logic circuitry.

Storage units 14 may include a computer-readable storage medium or computer-readable storage device. In some examples, storage units 14 include one or more of a short-term memory or a long-term memory. Storage units 14 may include, for example, random access memories (RAM), dynamic random access memories (DRAM), static random access memories (SRAM), magnetic hard discs, optical discs, flash memories, or forms of electrically programmable memories (EPROM) or electrically erasable and programmable memories (EEPROM). Storage units 14 may also include network or Cloud based databases or servers that reside outside of the computing device 10.

Storage units 14 may store an operating system (not shown) that controls the operation of components of computing device 10. For example, the operating system may facilitate the communication of fingerprint processing unit 18 with processors 12 and storage units 14. In some examples, storage units 14 are used to store program instructions for execution by processors 12. Storage units 14 may also be configured to store information within computing device 10 during operation. Storage units 14 may be used by software or applications (e.g., fingerprint processing unit 18) executed by processors 12 of computing device 10 to temporarily store information during program execution.

One or more cameras 16 may include an image sensor, an image processor, and/or any other components for capturing images. As described in greater detail below, in some examples, cameras 16 may include at least two cameras for capturing image 20 from different perspectives. In some instances, cameras 16 may be chosen in part based on a response to light in a chosen wavelength. For example, cameras 16 may comprise a five-megapixel (5 MP) image sensor due to a particular response in the blue wavelength.

Cameras 16 may be configured to capture one or more images of one or more friction ridge surfaces. A friction ridge surface may include any area of skin having durable morphological features or minutiae, including unique ridges, creases, scars and pores. Friction ridge surfaces are most commonly present on a person's hands or feet, and in particular, on phalange, on the sole of a person's feet or toes, on palmar surfaces of a hand, including the palm, fingers, the area between two joints on a finger, the area between two fingers, and fingertips. Minutiae can include, for example, a ridge ending (e.g., the abrupt end of a ridge), a ridge bifurcation (e.g., a single ridge that divides into two ridges), a short or independent ridge (e.g., a ridge that commences, travels a short distance, and then ends), an island (e.g., a single small ridge inside a short ridge or ridge ending that is not connected to all other ridges), a ridge enclosure (e.g., a single ridge that bifurcates and reunites shortly afterward to continue as a single ridge), a spur (e.g., a bifurcation with a short ridge branching off a longer ridge, a crossover or bridge (e.g., a short ridge that runs between two parallel ridges, a delta (e.g., a Y-shaped ridge meeting), a core (e.g., a U-turn in the ridge pattern) or the like.

In some instances, cameras 16 may be configured to photograph or capture an image of a user's finger 20. However, while certain techniques are described herein with respect to "fingerprints," it should be understood that the techniques may be similarly applied to any friction ridge surface. In any case, cameras 16 may use an electronic rolling shutter (ERS) or a global reset release shutter (GRRS). GRRS and ERS differ in terms of when the pixels become active for image capture. GRRS starts exposure for all rows of pixels at the same time, however, each row's total exposure time is longer than the exposure time of the previous row. ERS exposes each row of pixels for the same duration, but each row begins that row's exposure after the previous row has started.

In some instances, cameras 16 may use GRRS instead of ERS, in order to eliminate the effects of image shearing. Image shearing is an image distortion caused by non-simultaneous exposure of adjacent rows (e.g. causing a vertical line to appear slanted). Hand tremors produce motion that can lead to image shearing. Therefore, GRRS can be used to compensate for hand tremors and other movement artifacts. The duration of the flash and camera exposure duration may effect an amount of motion blur occurring due to subject and/or camera movement during image acquisition. To counteract the blurring that may occur with GRRS, cameras 16 may include an illumination shield or may implement other processing techniques to reduce the effects of ambient light.

According to aspects of this disclosure, fingerprint processing unit 18 may determine, based on one or more images from cameras 16, rolled fingerprint representation 24 to include data from at least two of perspectives 22. Rolled fingerprint representation 24 may include friction ridge surfaces and may be compared to legacy fingerprints, such as legacy "rolled" fingerprints discussed above. The example rolled fingerprint representation 24 illustrated in FIG. 1 is provided for purposes of illustration only, and may not be to scale. That is, rolled fingerprint representation 24 may include additional or fewer friction ridge features and may include data from a larger or smaller area of finger 20 than that shown in the example of FIG. 1.

Finger 20 is shown in the example of FIG. 1 as viewed from the relative end of finger 20 looking down the length of finger 20 with nail 26 disposed on top of finger 20. As described herein, fingerprint processing unit 18 determines rolled fingerprint representation 24 to include data from multiple perspectives 22 of a pad (illustrated as a heavy line) of finger 20. In this way, the techniques may be used to determine a representation of a fingerprint finger 20 that includes more data than a fingerprint captured from a single perspective (e.g., from perspective 22B only). While the example of FIG. 1 illustrates three perspectives 22, it should be understood that other examples may include more or fewer than those shown.

In some instances, fingerprint processing unit 18 may determine rolled fingerprint representation 24 to include data from an approximately 180-degree view 28 of the pad of finger 20. That is, fingerprint processing unit 18 may determine rolled fingerprint representation 24 to include data from approximately half (e.g., plus or minus 5 degrees, 10 degrees, or the like) of the circumference of finger 20 including the pad of finger 20. In other examples, fingerprint processing unit 18 may determine rolled fingerprint representation 24 to include more or less data, provided the representation includes data from multiple perspectives 22.

Fingerprint processing unit 18 may scale rolled fingerprint representation 24 to a particular resolution. In some instances, the resolution may be 500 pixels-per-inch (PH)) or 1000 PPI, because many government agencies or other entities may store legacy images to which rolled fingerprint representation 24 may be compared in 500 PPI or 1000 PH. In other examples, fingerprint processing unit 18 may scale rolled fingerprint representation 24 to any other resolution.

Figure 2:
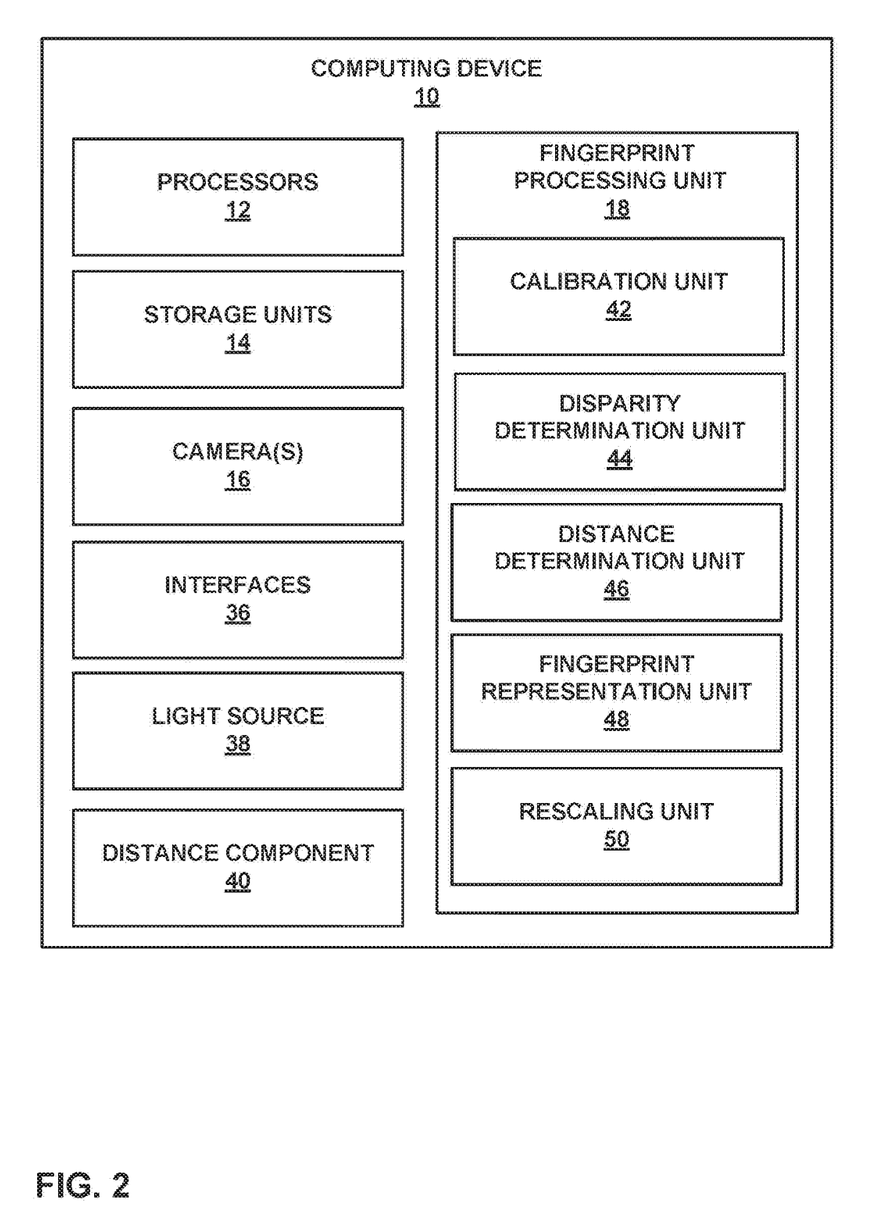
FIG. 2 is a block diagram illustrating the example computing device of FIG. 1 in greater detail.

As described herein, fingerprint processing unit 18 is configured to generate rolled fingerprint representation 24 without any contact of finger 20. That is, cameras 16 may capture images at a distance from finger 20. Hence, in order to appropriately scale rolled fingerprint representation 24, as described herein, fingerprint processing unit 18 may determine the distance between cameras 16 and finger 20 and scale rolled fingerprint representation 24 based on the determined distance, FIG. 2 is a block diagram illustrating the example computing device of FIG. 1 in greater detail. The example shown in FIG. 2 includes processors 12, storage units 14, one or more cameras 16, interfaces 36 and a light source 38. Fingerprint processing unit 18 of computing device 10 includes calibration unit 42, disparity determination unit 44, disparity determination unit 46, fingerprint representation unit 48, and resealing unit 50.

Again, the architecture of computing device 10 illustrated in FIG. 2 is shown for exemplary purposes only. In other examples, computing device 10 may be configured in a variety of other ways having additional, fewer, or alternative components than those shown in FIG. 2. For example, in some instances, computing device 10 may include a number of additional components such as a power supply, one or more displays, or the like.

As noted above, processors 12 may be configured to implement functionality and/or process instructions for execution within computing device 10, while storage units 14 may include a computer-readable storage medium or computer-readable storage device. Cameras 16 may be configured to capture images (e.g., such as image 20) of a friction ridge surface.

Computing device 10 may utilize interfaces 36 to communicate with external devices via one or more wired or wireless connections. Interfaces 36 may include network interfaces cards, universal serial bus (USB) interfaces, optical interfaces, or any other type of interface capable of sending and receiving information via a particular communication standard. Examples of network interfaces may include Ethernet, Wi-Fi, or Bluetooth radios.

Light source 38 may include light emitting diodes (LEDs) or other components for illuminating objects prior to capturing images of the objects with cameras 16. Human skin has been found to have higher reflectivity in the green and blue portions of the visible light spectrum, thus emitting light with wavelengths peaking in the blue and green portions of the visible light spectrum can help to more clearly illuminate details on a friction ridge surface of a user's hand. Accordingly, light source 38 may include LEDs that emit light peaking in the blue or green wavelengths (e.g., in the range of 440 to 570 nanometers (nm)).

Light emitted by light source 38 may be of varying power levels. Light source 38 may be, in some instances, paired with one or more light guides to direct the output of light source 38 in a uniform manner. In one instance, light guides are made of a polycarbonate tube lined with enhanced specular reflector (ESR) film and a turning film. In some instances, the light guides may collimate the emitted light so that each ray is parallel, reducing light scattering and undesired reflections.

In some examples, cameras 16 may incorporate one or more filtering components to block certain light. For example, in order to block ambient light, cameras 16 may include notch filters that block most ambient light but not a relatively narrow band centered around the wavelengths emitted by light source 38.

Distance component 40 may be responsible for measuring a distance between the object being captured by cameras 16 (e.g., such as finger 20) and cameras 16. Distance component 40 may include any variety of sensors capable of measuring displacement, distance or position. Examples of distance component 40 include one or more laser-based sensors, optical sensors, ultrasonic sensors, or the like. In other examples, distance component 40 may be a fixed, physical gauge connected to a device that incorporates cameras 16. In still other examples, distance component 40 may be incorporated into cameras 16 themselves. That is, cameras 16 may be used to determine a distance between an object and cameras 16. Distance component 40 may output data that indicates an absolute or relative distance or position (e.g., relative to cameras 16).

In some examples, distance component 40 may include one or more devices to generate audible feedback (e.g., one or more speakers), visual feedback (e.g., one or more displays, light emitting diodes (LEDs) or the like), or tactile feedback (e.g., a device that vibrates or provides other haptic feedback). In such examples, distance component 40 may output an audible, visual or tactile indication of a distance. For example, as described in greater detail below, fingerprint processing unit 18 may use the output from distance component 40 to ensure that images captured by cameras 16 have a particular resolution and/or include a particular field of view. Hence, distance component 40 may output an audible, visual or tactile output upon the object being captured (e.g., such as finger 20) being located at a particular distance and/or orientation with respect to cameras 16.

In an example for purposes of illustration, distance component 40 may generate feedback that indicates a target capture volume and/or optimal capture distance to a user. For example, distance component may generate and project two laser lines (e.g., corresponding dashed lines) from two angles such that when a surface is a particular distance from cameras 16 the two dashed lines form one continuous line. A variety of other different examples are also possible (e.g., two colors that sum to a third, or the like).

According to aspects of this disclosure, as noted above with respect to FIG. 1, fingerprint processing unit 18 may determine a rolled fingerprint representation that includes data from multiple perspectives of an object, such as finger 20. In some examples, multiple cameras 16 may be included in computing device 10 and data from cameras 16 may used to determine a distance between cameras 16 and the object. In such examples, calibration unit 42 may be configured to calibrate cameras 16. For example, calibration unit 42 may calibrate each of cameras 16 and correct for distortions within the lenses of cameras 16. In some examples, calibration unit 42 may perform the calibration by taking multiple images of a checkerboard with known square sizes across the full field of view of each of cameras 16. Calibration unit 42 may use the intersections of the black and white squares to find points in the taken image. Calibration unit 42 may use the determined points to calculate the camera intrinsic properties as well as the lens distortion. Calibration unit 42 may use such information to undistort the images.

In some examples, calibration unit 42 may also determine the extrinsic properties of cameras 16 (e.g., the physical relationship between cameras 16). Calibration unit 42 may determine the extrinsic properties by imaging a checkerboard pattern, with known black and white square sizes, with each of cameras 16 at the same time, but at different distances, in different planes, and with different orientations relative to cameras 16. Calibration unit 42 may determine the intersection of the black and white squares in images from each of cameras 16 and calculate a rotation and a translation of one of cameras 16 relative to another of cameras 16. After determining the extrinsic properties of cameras 16, calibration unit 42 may rectify images captured by cameras 16 such that calibration unit 42 may search for correspondences in the images in one dimension instead of two dimensions.

According to some aspects, calibration unit 42 may use OpenCV to calibrate cameras 16. For example, calibration unit 42 may apply the calibrateCamera function of OpenCV to determine intrinsic and extrinsic parameters of several views of a calibration pattern. In other examples, calibration unit 42 may use one or more techniques described in the document "A Four-step Camera Calibration Procedure with Implicit Image Correction," by Heikkila et al, Infotech Oulu and Department of Electrical Engineering, June 1997 to calibrate cameras 16.

Calibration unit 42 may be configured to calibrate cameras 16 at periodic intervals. For example, calibration unit 42 may calibrate cameras 16 at a time of installation of an apparatus that contains computing device 10. In other examples, calibration unit 42 may calibrate cameras 16 on a particular schedule, such as every six months, every year, or the like.

Upon cameras 16 being calibrated, disparity determination unit 44 may determine a disparity between perspectives captured by cameras 16. For example, disparity determination unit 44 may initially determine a disparity between a perspective captured by a first camera of cameras 16 and a perspective captured by a second camera of cameras 16. In one example, disparity determination unit 44 may determine a disparity map by locating corresponding feature points of images of the same object (e.g., a hand) taken from each of the first and second cameras 16 and determining a disparity between the feature points.

In some instances, disparity determination unit 44 may determine the disparity map by calculating a difference in pixel space between the same feature points in each image. In an example for purposes of illustration, disparity determination unit 44 may determine a location of a feature point (e.g., a block of pixels) in a first version of an image (such as image 20 of FIG. 1) as captured by a first camera of cameras 16. For example, disparity determination unit 44 may determine the location using a Cartesian or a similar coordinate system. Disparity determination unit 44 may also determine a location of the same feature point in a second version of the image as captured by a second camera of cameras 16. Disparity determination unit 44 may determine the disparity as a difference in the number of pixels between the determined location in the first version of the image and the determined location in the second version of the image.

In some instances, the density of the disparity map may be dependent on the number of reliably matched feature points that can be identified in each of the images. For example, disparity determination unit 44 may initially determine similar feature points by determining a sum of absolute differences (SAD) (or other similarity metric) between blocks of pixels of the first image and blocks of pixels of the second image. In some instances, disparity determination unit 44 may only determine disparities for blocks having differences that are less than a particular threshold.

In some instances, the block size used for feature points and/or the similarity threshold may be variable depending on the application in which computing device 10 is used. For example, in a high security application in which the processed image is compared to another image with a relatively high degree of scrutiny, disparity determination unit 44 may determine disparities for relatively small blocks of pixels and/or set the similarity threshold such that a disparity is only determined for blocks of pixels having a high degree of similarity.

Distance determination unit 46 may determine a distance between objects represented in images from cameras 16 a plane of interest (e.g., such as an image plane defined by cameras 16 or another fixed plane between the objects and cameras 16). The distance may be a Euclidean distance between the object(s) and the plane of interest. In instances in which distance determination unit 46 uses cameras 16 to determine distances, distance determination unit 46 may determine the distances based on disparities, e.g., as determined by disparity determination unit 44. In one example, distance determination unit 46 may determine distances by multiplying a camera separation distance between cameras 16 by a focal length of the cameras 16 and dividing by a determined disparity. In other examples, distance determination unit 46 may determine distances based on disparity using a variety of other techniques based on output from distance component 40.

According to aspects of this disclosure, fingerprint representation unit 48 determines a rolled fingerprint representation of an object (e.g., such as finger 20) from one or more images captured by one or more cameras 16. As described herein, fingerprint representation unit 48 may include data in the representation from a plurality of perspectives (e.g., such as perspectives 22). In some examples, fingerprint representation unit 48 may perform image stitching to combine data from different perspectives to generate a single rolled fingerprint representation. In other examples, fingerprint representation unit 48 may generate a three-dimensional representation of an object and transform the three-dimensional representation of the object to a two-dimensional representation.

In an example for purposes of illustration, in operation, one or more cameras 16 may be positioned to capture one or more images of an object, such as a finger or hand of a person. As described herein, in some examples, computing device 10 may be a mobile computing device having a relatively small form factor that allows computing device 10 to be articulated with respect to the object being captured by cameras 16. Distance component 40 may measure the distance between the object being captured and cameras 16. When located at a predetermined distance, e.g., as determined by distance determination unit 16, computing device 10 may generate a visual, audible or tactile output to indicate that the object is at the appropriate range and/or the field of view is appropriate for capture.

Light source 38 may illuminate the object and cameras 16 may capture one or more images of the object. The one or more images may include a plurality of perspectives of the object. For example, as described in greater detail with respect to FIGS. 3A and 3B below, multiple cameras 16 may be positioned to capture images of the object from different angular viewpoints. In other examples, a single or multiple cameras 16 may capture one or more images that include a reflection of at least a portion of the object.

In some examples, light source 38 may be configured to generate relatively uniform light across the curvature of finger 20. For example, light source 38 may generate light for illuminating finger 20 that avoids oversaturating or shadowing certain portions of finger 20. In some examples, light source 38 may include more than one lighting component that are positioned at various points with respect to finger 20. In some examples, cameras 16 may be configured to capture images of finger 20 without finger 20 being in an enclosed space. In such examples, light source 38 may be configured to provide relatively uniform lighting of the curved surface of finger 20 in a way that compensates for ambient light.

Fingerprint representation unit 48 may generate, from the one or more images captured by cameras 16, a rolled fingerprint representation that includes data from a plurality of perspectives. For example, fingerprint representation unit 48 may stich together portions of an image or data from multiple images to generate a rolled fingerprint representation of the object. In some examples, fingerprint representation unit 48 may apply one or more algorithms (e.g., based on parameters determined by calibration unit 42) to combine portions of an image or data from multiple images. Fingerprint representation unit 48 may compensate for exposure differences between cameras by performing shade or color adjustments.

For example, fingerprint representation unit 48 may perform feature matching of data from the different perspectives. That is, fingerprint representation unit 48 may identify feature points of the same object captured from different perspectives. Fingerprint representation unit 48 may apply one or more merging, stitching, aligning or other algorithms to join portions of an image or multiple images, with the feature points located along the boundary of the different perspectives. Fingerprint representation unit 48 may output a two-dimensional representation of the object that includes data from multiple perspectives. In some instances, fingerprint representation unit may generate an image file (e.g., a bitmap, jpeg, or the like) that contains the rolled fingerprint representation and store the image file to storage units 14.

According to aspects of the disclosure, number of cameras 16, orientation of cameras 16, and/or other components responsible for image capture (e.g., such as reflective surfaces) may be configured to ensure that there is sufficient overlap, e.g., in terms of field of view, in order to allow for image registration. That is, cameras 16 may be configured to capture images having at least some of the same data so that images can be accurately merged.

In another example, fingerprint representation unit 48 may generate a three-dimensional model of object from one or more images of the object. Fingerprint representation unit 48 may then transform the three-dimensional representation of the object to a two-dimensional representation of the object. That is, fingerprint representation unit 48 may apply one or more algorithms to the three-dimensional representation to generate a rolled fingerprint representation of the object. Example algorithms are described in international Publication No. WO 2016/144671 A1, published Sep. 15, 2016 and assigned to 3M Innovative Properties Company.

Resealing unit 50 may determine a resolution of each of images from cameras 16 and/or a rolled fingerprint representation generated by fingerprint representation unit 48. For example, resealing unit 50 may determine the resolution based on distance calculations from distance determination unit 44. In an example for purposes of illustration, resealing unit 50 may determine the resolution by dividing a focal length of a lens of cameras 16 by a product of a distance from the lens to an object (e.g., such as finger 20) and a pixel size of an imaging sensor of cameras 16.

Resealing unit 50 may apply any variety of downscaling and/or down sampling algorithms. For example, resealing unit 50 may apply a low-pass spatial filter, followed by removing points (conceptually). In another example, resealing unit 50 may resample using a local interpolating function. In some examples, resealing unit 50 may apply a low-pass or other filter in conjunction with performing interpolation. Example filters that may be used by resealing unit 50 may include a bicubic filter, a sinc filter, a Lanczos filter, or a wide variety of other filters. Resealing unit 50 may then scale the resolution of each of the ROIs to a particular resolution. In some examples, resealing unit 50 may scale the resolution of the rolled fingerprint representation to 500 PPI, 1000 PPI, or any other resolution.

Fingerprint processing unit 18 may output rolled fingerprint representations (or other processed images). For example, fingerprint processing unit 18 may output data that represents the processed images to another external device via interfaces 36. In other examples, fingerprint processing unit 18 may store data that represents the processed images to storage units 14.

It should be understood that the components of fingerprint processing unit 18 illustrated in FIG. 2 are provided for purposes of example only, and that other examples may have more, fewer, or an alternative arrangement of components than those shown. For example, fingerprint processing unit 18 may include a subset of the units shown in FIG. 2, e.g., omitting calibration unit 42, disparity determination unit 44, and/or other units. In addition, as described herein, computing device 10 may not include cameras 16, light source 38, or distance component 40, which may be distributed in one or more other devices that are in communication with computing device 10.

Figure 3A:
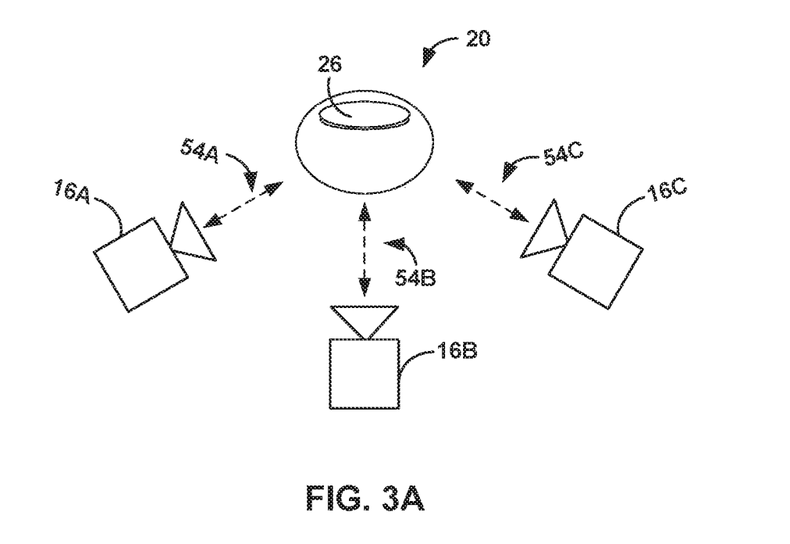
FIGS. 3A and 3B illustrate example camera orientations for capturing one or more images that include multiple perspectives of a finger.
Figure 3B:
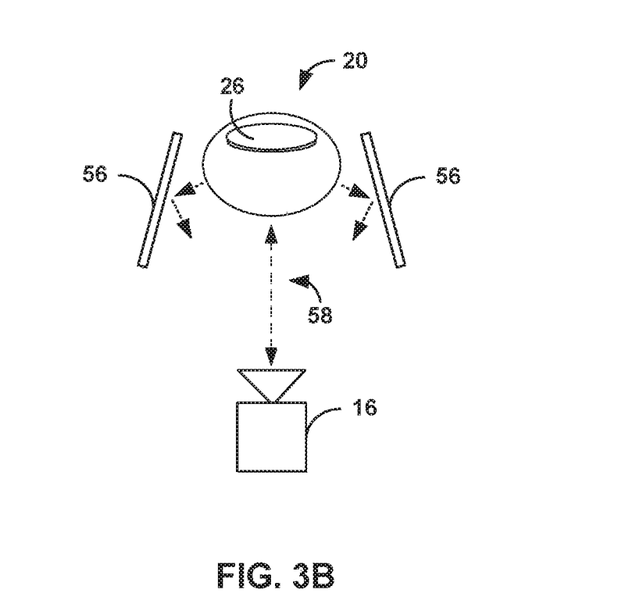

FIGS. 3A and 3B illustrate example camera orientations for capturing one or more images that include multiple perspectives of finger 20. For example, FIG. 3A illustrates multiple cameras including first camera 16A, second camera 16B, and third camera 16C (collectively, cameras 16), with each of cameras 16 oriented to capture a respective perspective of finger 20. While the example of FIG. 3A illustrates three cameras 16, it should be understood that fewer or additional cameras 16 may be included to capture images of finger 20 from fewer or additional respective perspectives.

In some examples, finger 20 may be positioned in a particular location relative to cameras 16 prior to capturing the one or more images. For example, in order to capture images and/or generate a rolled fingerprint representation that includes a desired quantity data (e.g., captures data from 180-degress of finger 20) and/or has a desired resolution, finger 20 may be positioned a first distance 54A from camera 16A, a second distance 54B from second camera 16B, and a third distance 54C from third camera 16C. In some examples, computing device 10 may be stationary and a user may move finger 20 to distances 54A-54C to capture images of finger 20. In other examples, according to aspects of this disclosure, computing device 10 may have a relatively smaller form factor and may be moveable with respect to finger 20. In such examples, as described in greater detail with respect to the example of FIG. 4 below, computing device 10 may be moved to distances 54A-54C to capture images of finger 20.

Computing device 10 may generate an output upon finger 20 being positioned first distance 54A from camera 16A, a second distance 54B from second camera 16B, and a third distance 54C from third camera 16C. For example, computing device 10 may generate an audible, visual, and/or tactical output upon finger 20 being positioned at distances 54A-54C to capture images of finger 20. In some examples, computing device 10 may output respective indications for each of first camera 16A, second camera 16B and third camera 16B being moved to respective distances 54A-54C.

FIG. 3B illustrates an example having a single camera 16 and reflective surfaces 56. For example, rather than (or in addition to) having multiple cameras to capture separate images from different perspectives, reflective surfaces 56 may be positioned to reflect a perspective of finger 20. Hence, upon finger 20 being positioned at distance 58, camera 16 may capture an image that includes data of multiple perspectives of finger 20. That is, camera 16 may directly capture a first perspective of finger 20 as well as one or more reflections of finger 20 that include one or more other perspectives.

It should be understood that the example of FIG. 3B is provided for purposes of illustration only and is not necessarily to scale. Moreover, other examples may include fewer or additional reflective surfaces positioned in orientations other than those shown.

FIG. 4 is conceptual diagram illustrating an example of computing device 10 that is configured to capture one or more images for generating a rolled fingerprint representation, according to aspects of this disclosure. The example of FIG. 4 illustrates computing device 10 as a handheld device that is movable with respect to an object for which a rolled fingerprint representation is being generated.

For example, a body of computing device 10 includes a handle 62 and a capture trigger 64. A user may hold computing device 10 by handle 62 and articulate computing device 10 in order to position cameras 16 in a location to capture one or more images of an object, such as finger 20. Distance component 40 (e.g., illustrated as a laser-based sensor in the example of FIG. 4) may determine a distance between cameras 16 and the object. Computing device 10 may generate an audible, visual or tactile indication upon moving cameras 16 to a predetermined distance from finger 20.

Based on the feedback, a user of computing device 10 may depress capture trigger 64, which may cause light source 38 to illuminate finger 20 and actuate cameras 16. As described herein, cameras 16 may capture one or more images that include a plurality of perspectives of finger 20. Computing device 10 may generate a rolled fingerprint representation of finger 20 that includes data from the plurality of perspectives. Computing device 10 may output or store the determined representation. For example, computing device 10 may generate an image file (e.g., a bitmap, jpeg, or the like) that contains the rolled fingerprint representation and store the image file to memory.

It should be understood that the particular arrangement and operation of components of computing device 10 illustrated in FIG. 4 are provided for purposes of illustration only and that other examples are within the scope of this disclosure. For example, the example shown in FIG. 4 includes three cameras 16 disposed horizontally across computing device 10. However, in other examples, computing device 10 may include fewer or additional cameras 16 and/or cameras 16 may be alternatively arranged. As another example, the example shown in FIG. 4 includes capture trigger 64 that is actuated by a user. However, in other examples, computing device 10 may be configured to automatically illuminate light source 38 and actuate cameras 16 upon cameras 16 being appropriately positioned with respect to the object being captured (e.g., as measured by distance component 40).

Figure 5:
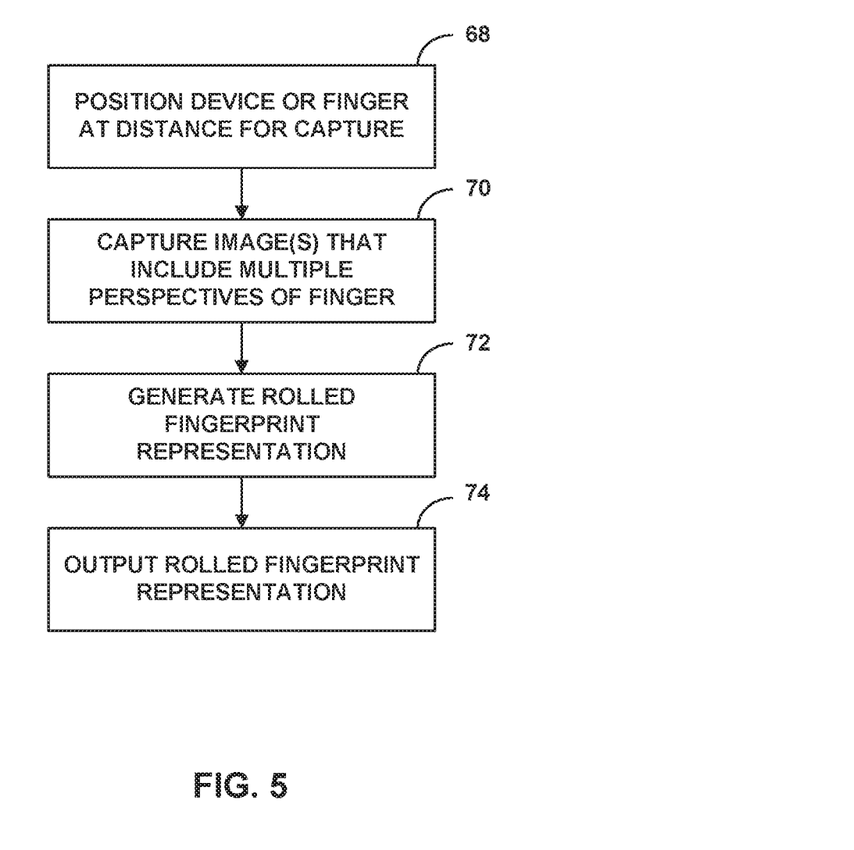
FIG. 5 is a flow diagram illustrating an example process for determining a rolled fingerprint representation, according to aspects of this disclosure.

FIG. 5 is a flow diagram illustrating an example process for determining a rolled fingerprint representation, according to aspects of this disclosure. Although described with respect to computing device 10 (FIGS. 1 and 2), it should be understood that other devices may be configured to perform a process the same as or similar to that of FIG. 5.

In the example of FIG. 5, computing device 10 or finger 20 is positioned at a particular distance for capture (68). For example, in instances in which computing device 10 is a moveable device (e.g., a handheld device), a user may position computing device 10 in a particular orientation with respect to finger 20. In some examples, distance component 40 may measure the distance between cameras 16 and finger 20, and computing device 10 may generate an audible, visual or tactile output that computing device 10 is positioned in the particular orientation.

Cameras 16 capture one or more images that include multiple perspectives of finger 20 (70). In some examples, a plurality of cameras 16 may capture a plurality of images, with each image including a respective perspective. Camera 16 may capture each of the plurality of images at the same instance in time. In other examples, one or more cameras 16 may capture an image that include a reflection of at least a portion of finger 20, such that the resulting image includes multiple perspectives of finger 20.

Computing device 10 generates a rolled fingerprint representation that includes data from the plurality of perspectives (72). For example, computing device 10 may stitch portions of an image or multiple images to generate the rolled fingerprint representation. In other examples, computing device 10 may generate a three-dimensional representation of finger 20 and convert the three-dimensional representation to a two-dimensional rolled fingerprint representation. Computing device 10 may, in some examples, scale or apply perspective correction to the rolled fingerprint representation.

Computing device 10 outputs the rolled fingerprint representation (74). In some examples, computing device 10 may transmit the rolled fingerprint representation to another computing device. In other examples, computing device 10 may store the rolled fingerprint representation to memory. Computing device 10 or another device that receives the rolled fingerprint representation may compare the rolled fingerprint representation to other fingerprints, such as a database of fingerprints.

It should be understood that the techniques described with respect to FIG. 5 are provided for illustrative purposes and that other techniques are within the scope of this disclosure. For example, other example processes may include more, fewer, or an alternative arrangement of steps than those shown in the example of FIG. 5.

Example 1: A method comprising capturing one or more friction ridge images of a finger at an instance in time, the one or more friction ridge images including a plurality of perspectives of the finger; determining, from the one or more friction ridge images, a rolled fingerprint representation of the finger, the rolled fingerprint representation comprising data from the plurality of perspectives; and outputting the rolled fingerprint representation.

Example 2: The method of claim 1, wherein the plurality of perspectives comprise a 180-degree view of a pad of the finger, and wherein the rolled fingerprint representation comprises an approximately 180-degree representation of the pad of the finger.

Example 3: The method of any of Examples 1-2, wherein capturing the one or more friction ridge images comprises capturing a single friction ridge image from a single camera, the single friction ridge image comprising at least one reflection of at least a portion of the finger.

Example 4: The method of any of Examples 1-3, wherein capturing the one or more friction ridge images comprises capturing a plurality of friction ridge images from a plurality of cameras corresponding to the plurality of perspectives.

Example 5: The method of any of Examples 1-4, wherein determining the rolled fingerprint representation comprises determining a two-dimensional rolled fingerprint representation, and wherein determining the two-dimensional rolled fingerprint representation comprises stitching data from the plurality of perspectives.

Example 6: The method of any of Examples 1-5, wherein determining the rolled fingerprint representation comprises determining a three-dimensional rolled fingerprint representation and converting the three-dimensional rolled fingerprint representation to the rolled fingerprint representation.

Example 7: The method of any of Examples 1-6, wherein determining the rolled fingerprint representation comprises scaling the rolled fingerprint representation to one of 500 pixels per inch or 1000 pixels per inch.

Example 8: The method of any of Examples 1-7, further comprising: prior to capturing the one or more friction ridge images, determining a distance between one or more cameras responsible for capturing the one or more friction ridge images and the finger; and outputting an indication that the distance is equal to a predetermined distance for capturing the one or more friction ridge images.

Example 9: The method of any of Examples 1-8, wherein determining the distance comprises receiving, by a computing device responsible for determining the rolled fingerprint representation, data that indicates the distance from a distance sensor and determining, by the computing device, the distance based on the data.

Example 10: The method of any of Examples 1-9, wherein outputting the indication of the distance comprises generating an audible indication, a visual indication, or a tactile indication.

Example 11: The method of any of Examples 1-10, wherein capturing the one or more friction ridge images comprises articulating a handheld computing device for capturing the one or more friction ridge images to a predetermined position relative to the finger.

Example 12: The method of any of Examples 1-11, wherein outputting the rolled fingerprint representation comprises generating an image file that contains the rolled fingerprint representation and storing the image file to memory.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor", as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the example, certain acts or events of any of the methods described herein can be performed in a different sequence, may be added, merged, or left out all together (e.g., not all described acts or events are necessary for the practice of the method). Moreover, in certain examples, acts or events may be performed concurrently, e.g., through multi-threaded processing, interrupt processing, or multiple processors, rather than sequentially.

In some examples, a computer-readable storage medium includes a non-transitory medium. The term "non-transitory" indicates, in some examples, that the storage medium is not embodied in a carrier wave or a propagated signal. In certain examples, a non-transitory storage medium stores data that can, over time, change (e.g., in RAM or cache).

Various examples have been described. These and other examples are within the scope of the following claims.

What is claimed is:

1. A method comprising:
   determining a distance between one or more cameras responsible for capturing one or more friction ridge images and a finger;
   after determining said distance, capturing the one or more friction ridge images of the finger at an instance in time, the one or more friction ridge images including a plurality of perspectives of the finger;
   determining, from the one or more friction ridge images, a rolled fingerprint representation of the finger, the rolled fingerprint representation comprising data from the plurality of perspectives;
   outputting the rolled fingerprint representation, and
   outputting an indication that the distance is equal to a predetermined distance for the capturing of the one or more friction ridge images.

2. The method of claim 1, wherein the plurality of perspectives comprise a 180-degree view of a pad of the finger, and wherein the rolled fingerprint representation comprises an approximately 180-degree representation of the pad of the finger.

3. The method of claim 1, wherein said capturing of the one or more friction ridge images comprises capturing a single friction ridge image from a single camera, the single friction ridge image comprising at least one reflection of at least a portion of the finger.

4. The method of claim 1, wherein said capturing of the one or more friction ridge images comprises capturing a plurality of friction ridge images from a plurality of cameras corresponding to the plurality of perspectives.

5. The method of claim 1, wherein said determining of the rolled fingerprint representation comprises determining a two-dimensional rolled fingerprint representation, and wherein determining the two-dimensional rolled fingerprint representation comprises stitching data from the plurality of perspectives.

6. The method of claim 1, wherein said determining of the rolled fingerprint representation comprises determining a three-dimensional rolled fingerprint representation and converting the three-dimensional rolled fingerprint representation to the rolled fingerprint representation.

7. The method of claim 1, wherein said determining of the rolled fingerprint representation comprises scaling the rolled fingerprint representation to one of 500 pixels per inch or 1000 pixels per inch.

8. The method of claim 1, wherein said determining of the distance comprises receiving, by a computing device responsible for determining the rolled fingerprint representation, data that indicates the distance from a distance sensor and determining, by the computing device, the distance based on the data.

9. The method of claim 1, wherein said outputting of the indication of the distance comprises generating an audible indication, a visual indication, or a tactile indication.

10. The method of claim 1, wherein said capturing of the one or more friction ridge images comprises articulating a handheld computing device for capturing the one or more friction ridge images to a predetermined position relative to the finger.

11. The method of claim 1, wherein the outputting of the rolled fingerprint representation comprises generating an image file that contains the rolled fingerprint representation and storing the image file to memory.

12. A non-transitory computer-readable medium having instructions stored thereon that, when executed, cause one or more processors to perform each step of claim 1.

13. A device comprising:
    a distance component configured to determine a distance between one or more cameras responsible for capturing one or more friction ridge images and a finger;
    one or more cameras configured to capture, after the distance component determines said distance, the one or more friction ridge images of the finger at an instance in time, the one or more friction ridge images including a plurality of perspectives of the finger;
    a memory configured to store the one or more friction ridge images, and
    one or more processors configured to:
        determine, from the one or more friction ridge images, a rolled fingerprint representation of the finger, the rolled fingerprint representation comprising data from the plurality of perspectives;
        output the rolled fingerprint representation, and
        output an indication that the distance is equal to a predetermined distance for the capturing of the one or more friction ridge images.

14. The device of claim 13, wherein the plurality of perspectives comprises a 180-degree view of a pad of the finger, and wherein the rolled fingerprint representation comprises an approximately 180-degree representation of the pad of the finger.

15. The device of claim 13, wherein the one or more cameras is one camera and wherein capturing the one or more friction ridge images comprises capturing a single friction ridge image, the single friction ridge image comprising at least one reflection of at least a portion of the finger.

16. The device of claim 13, wherein the one or more cameras comprises a plurality of cameras, and wherein capturing the one or more friction ridge images comprises capturing a plurality of friction ridge images from the plurality of cameras, the plurality of cameras corresponding to the plurality of perspectives.

17. The device of claim 13, wherein the one or more processors, in the determining of the rolled fingerprint representation, are configured to determine a two-dimensional rolled fingerprint representation by stitching data from the plurality of perspectives.

18. The device of claim 13, wherein the one or more processors, in the determining of the rolled fingerprint representation, are configured to determine a three-dimensional rolled fingerprint representation and convert the three-dimensional rolled fingerprint representation to the rolled fingerprint representation.

19. The device of claim 13, further comprising an output component configured to output audible indication, a visual indication, or a tactile indication of the distance.

20. The device of claim 13, wherein the device comprises a handheld device.

21. The device of claim 13, further comprising a light source configured to illuminate the finger.

22. The device of claim 13, further comprising a trigger component that is configured to initiate the one or more cameras.

* * * * *